United States Patent
Ponzio et al.

(10) Patent No.: US 10,418,888 B2
(45) Date of Patent: Sep. 17, 2019

(54) APPARATUS AND METHOD FOR POSITIONING AND WINDING POLE MEMBERS OF DYNAMO ELECTRIC MACHINES

(71) Applicant: ATOP S.p.A., Barberino Val d'Elsa, Florence (IT)

(72) Inventors: Massimo Ponzio, Florence (IT); Rubino Corbinelli, Siena (IT)

(73) Assignee: ATOP S.p.A., Barberino Val d'Elsa, Florence (IT)

( * ) Notice: Subject to any disclaimer, the term of this patent is extended or adjusted under 35 U.S.C. 154(b) by 968 days.

(21) Appl. No.: 14/893,455

(22) PCT Filed: May 30, 2014

(86) PCT No.: PCT/EP2014/061250
§ 371 (c)(1),
(2) Date: Nov. 23, 2015

(87) PCT Pub. No.: WO2014/198561
PCT Pub. Date: Dec. 18, 2014

(65) Prior Publication Data
US 2016/0126815 A1   May 5, 2016

(30) Foreign Application Priority Data
Jun. 11, 2013   (IT) ................ PI2013A0052

(51) Int. Cl.
*H02K 15/095* (2006.01)
*B65H 81/00* (2006.01)
*H02K 1/14* (2006.01)

(52) U.S. Cl.
CPC ........... *H02K 15/095* (2013.01); *B65H 81/00* (2013.01); *H02K 1/148* (2013.01)

(58) Field of Classification Search
CPC ....... B65H 81/00; H02K 15/02; H02K 15/095
See application file for complete search history.

(56) References Cited

U.S. PATENT DOCUMENTS 1,012,257 A * 12/1911 Jeffrey ................... H02K 3/522
310/194
1,506,746 A * 9/1924 Griffith .................. H02K 3/325
310/194

(Continued)

FOREIGN PATENT DOCUMENTS

DE   10 2009 060838   7/2011
EP        1 098 425     5/2001

OTHER PUBLICATIONS

International Search Report dated Feb. 4, 2015 for PCT/EP2014/061250.

*Primary Examiner* — Emmanuel M Marcelo
(74) *Attorney, Agent, or Firm* — Haley Guiliano LLP; Jeffrey H. Ingerman; Jason S. Ingerman

(57) ABSTRACT

An apparatus and a method for winding turns of coils of pole members (11), in which a pole member (11) comprises at least a flange portion (13*b*) connected to a body portion (13*a*) for receiving turns of coils C during winding. The apparatus comprises a conductor dispenser member (50') for dispensing a conductor W for forming turns of coils C by movement of the conductor dispenser member (50') with respect to the pole member being wound. The apparatus is also provided with a pole member holder (10) comprising a plurality of seats (15) suitable for receiving a flange portion (13*b*) of the pole member (11), a plurality of base members (18) of the seats (15) for engaging a first end (13*b*'') of a pole member (11) with a pushing force and locking means (20) associated with each seat (15) for engaging and referencing a second end (13*b*') of the pole members (11) with respect to the conductor dispenser member (50'). The invention also (Continued)

concerns a pole member holder (10) as described in the foregoing.

22 Claims, 4 Drawing Sheets

(56) References Cited

U.S. PATENT DOCUMENTS

| | | | | |
|---|---|---|---|---|
| 4,131,988 A * | 1/1979 | Finegold | ............... | H02K 3/18 140/92.2 |
| 4,312,387 A * | 1/1982 | Finegold | ............ | H02K 15/095 140/92.2 |
| 5,918,360 A * | 7/1999 | Forbes | ............... | D06F 37/304 29/596 |
| 6,515,396 B1 * | 2/2003 | Fritzsche | ............... | H02K 1/148 310/216.076 |
| 6,532,645 B1 * | 3/2003 | Becherucci | ........ | H02K 15/0075 242/361.1 |
| 6,573,632 B2 * | 6/2003 | Hsu | ............... | H02K 1/148 310/194 |
| 6,787,966 B2 * | 9/2004 | Haga | ............... | H02K 1/24 29/732 |
| 6,888,284 B2 * | 5/2005 | Eggers | ............... | H02K 1/148 310/216.074 |
| 7,003,867 B2 * | 2/2006 | Yamamoto | ............... | H02K 1/24 242/361.1 |
| 7,859,165 B2 * | 12/2010 | Moroto | ............... | F02M 37/08 310/224 |
| 8,400,043 B2 * | 3/2013 | Leiber | ............... | H02K 1/148 310/215 |
| 8,674,564 B2 * | 3/2014 | Hessenberger | ........ | H02K 1/141 310/216.008 |
| 2005/0029385 A1 * | 2/2005 | Stratico | ............... | H02K 15/095 242/432.2 |
| 2005/0051661 A1 | 3/2005 | Faulhammer et al. | | |
| 2006/0163964 A1 * | 7/2006 | Kojima | ............... | H02K 1/148 310/156.37 |
| 2014/0042866 A1 * | 2/2014 | Zhao | ............... | H02K 1/148 310/216.007 |

* cited by examiner

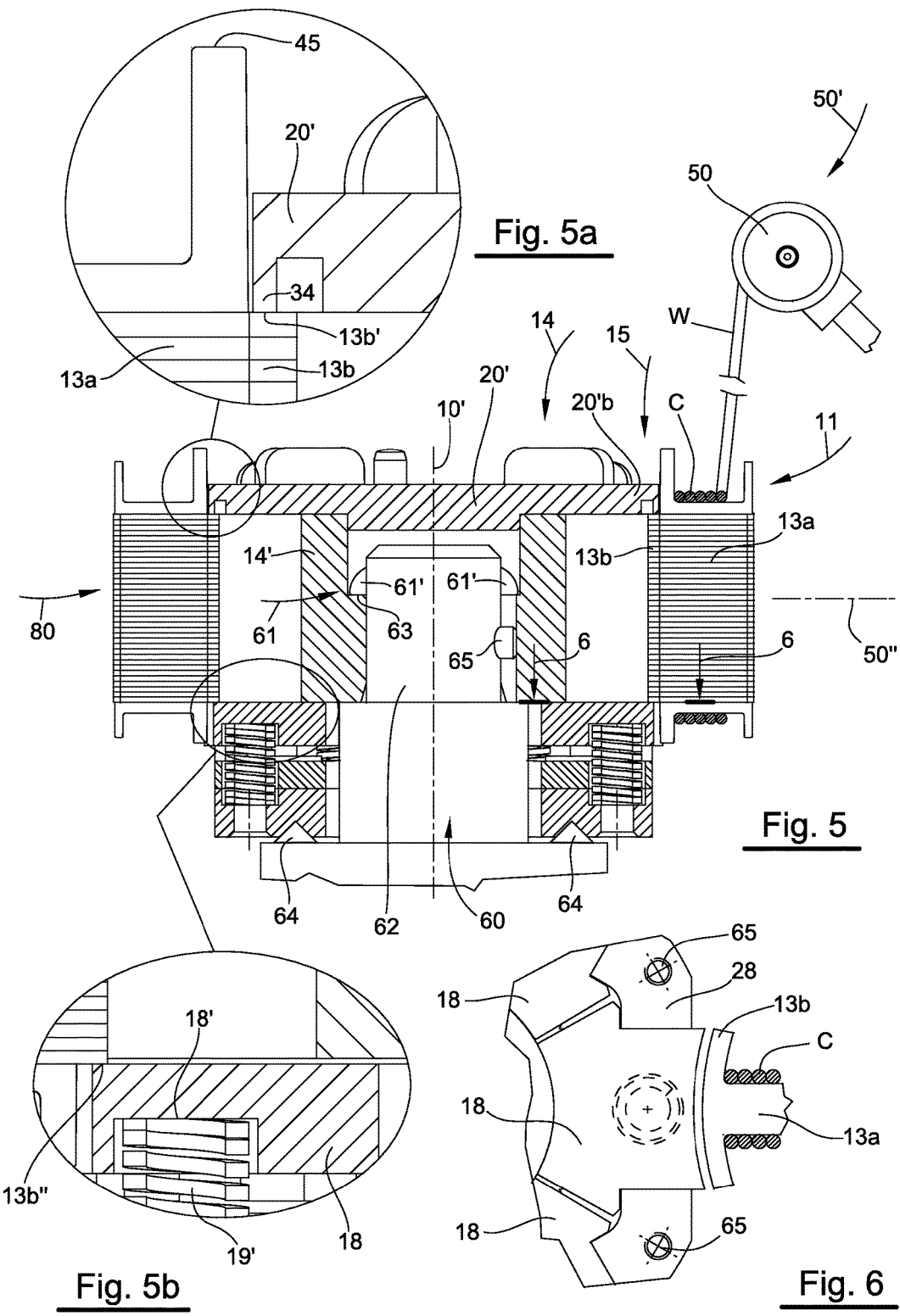

APPARATUS AND METHOD FOR POSITIONING AND WINDING POLE MEMBERS OF DYNAMO ELECTRIC MACHINES

FIELD OF THE INVENTION

The present invention concerns solutions for winding pole members by using conductor dispensers, like a flyer or a needle dispenser, which have relative motion with respect to a coil receiving portion of the pole members.

BACKGROUND OF THE INVENTION

As is known, after winding, the pole members are assembled together to form a wound core, which is normally a stator component of an electric motor having the field of the pole members directed internally.

During winding a predetermined number of turns of conductor needs to be delivered and positioned with accuracy to form the coils. The turns of the coils need to be stratified with a required position precision, and the conductor stretches which form the turns need to be regularly positioned. Winding and assembly of pole members according to these principles have been described in EP 1098425, where pliers are provided for holding the pole members. Each plier is moveable on a respective movement device of a transfer table to position the pole members for winding and assembly of a stator. The pole members are secured to the pliers by catches that are assembled on the pliers. Each plier is provided with a shelf for abutment of the lower end of a pole member.

The devices and operations employed to position the pole members in preparation for winding and during winding have an important contribution to the achievement of the accuracy of the coil formation. This accuracy is particularly influenced by the high winding speed of the flyers, or of the needles, used for winding and by the tension applied on the conductor during winding. The objective is to guarantee correct forming of the coils dependent on the construction of the pole members and the characteristics of the conductor used for winding.

SUMMARY OF THE INVENTION

It is a scope of the present invention to provide a holder for holding pole members during winding of coils.

It is also a scope of the present invention to provide an apparatus and related method for positioning and winding pole members so that the position of the coils are referenced with respect to a common reference.

It is also a scope of the present invention to provide an apparatus and related method for positioning pole members and the conductor that connect coils of the pole members.

It is a further scope of the present invention to provide an apparatus and a method for positioning and winding pole members, wherein the apparatus and method can be used in production systems having different types of transport device for conveying the pole members to the winder.

These and other scopes are obtained by using a holder device for holding pole members according to the features described in this disclosure.

According to another aspect of the invention, an apparatus for positioning and winding pole members of dynamo electric machines is described in this disclosure.

According to another aspect of the invention, a method for positioning and winding pole members of dynamo electric machines is described in this disclosure.

BRIEF DESCRIPTION OF THE DRAWINGS

The invention will be now shown with the following description of exemplary embodiments thereof, exemplifying but not limitative, with reference to the attached drawings in which:

FIG. 5 is a view similar to the view of FIG. 4;

FIG. 5a is an enlargement view of a portion of FIG. 5;

FIG. 5b is an enlargement view of a portion of FIG. 5;

FIG. 6 is a partial section view from directions 6-6 of FIG. 5;

DETAILED DESCRIPTION OF SOME EXEMPLARY EMBODIMENTS

Figure 1:
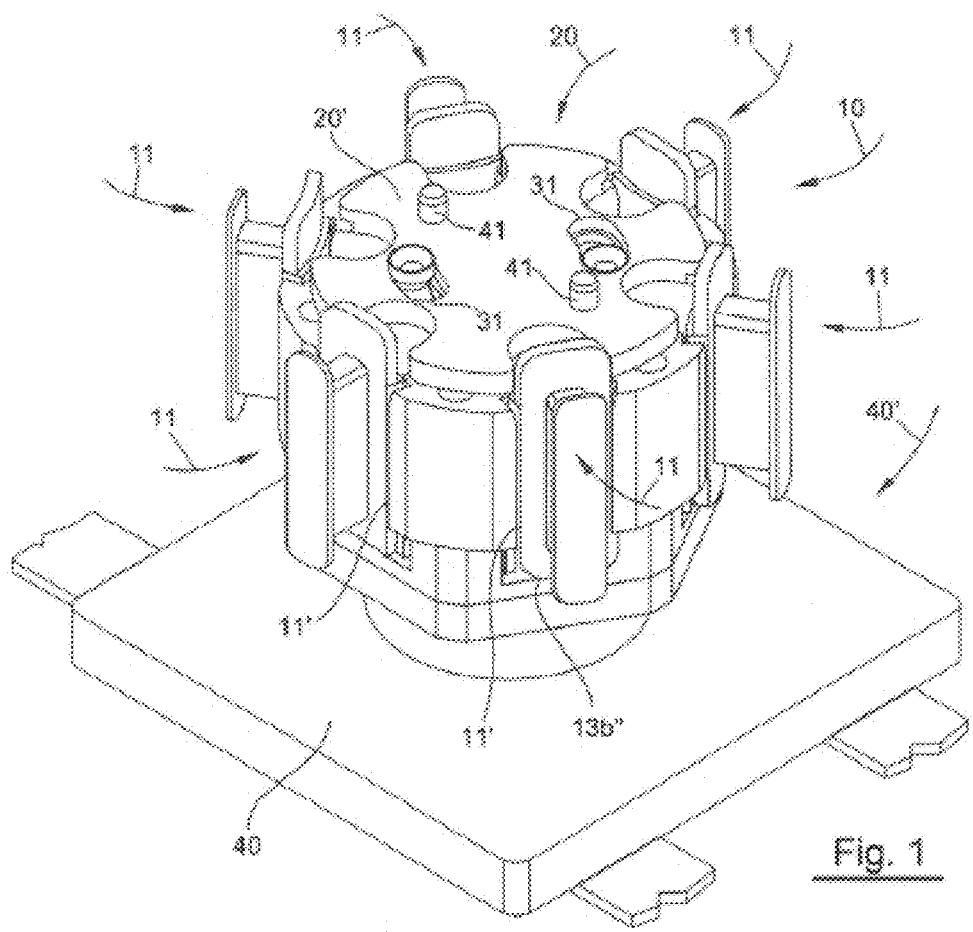
FIG. 1 is a prospective view of the apparatus of the invention.

FIG. 1 illustrates pole member holder 10 assembled on a transport pallet 40 of a transport device 40'. Pole members 11 are seated in respective seats 15 of the pole member holder 10.

Figure 2:
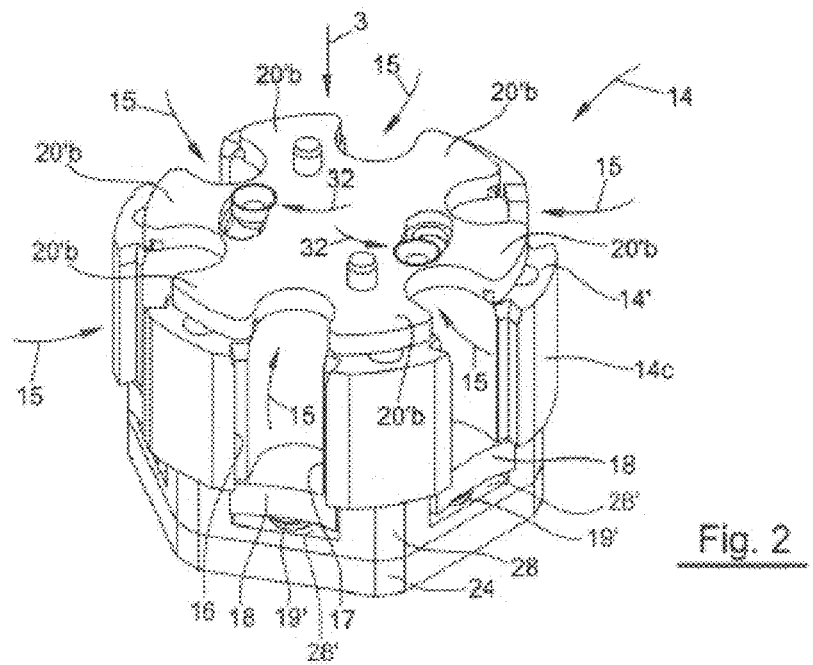
FIG. 2 is a prospective view of a part of the apparatus of FIG. 1, with certain parts of FIG. 1 that have been removed for reasons of clarity.
Figure 3:
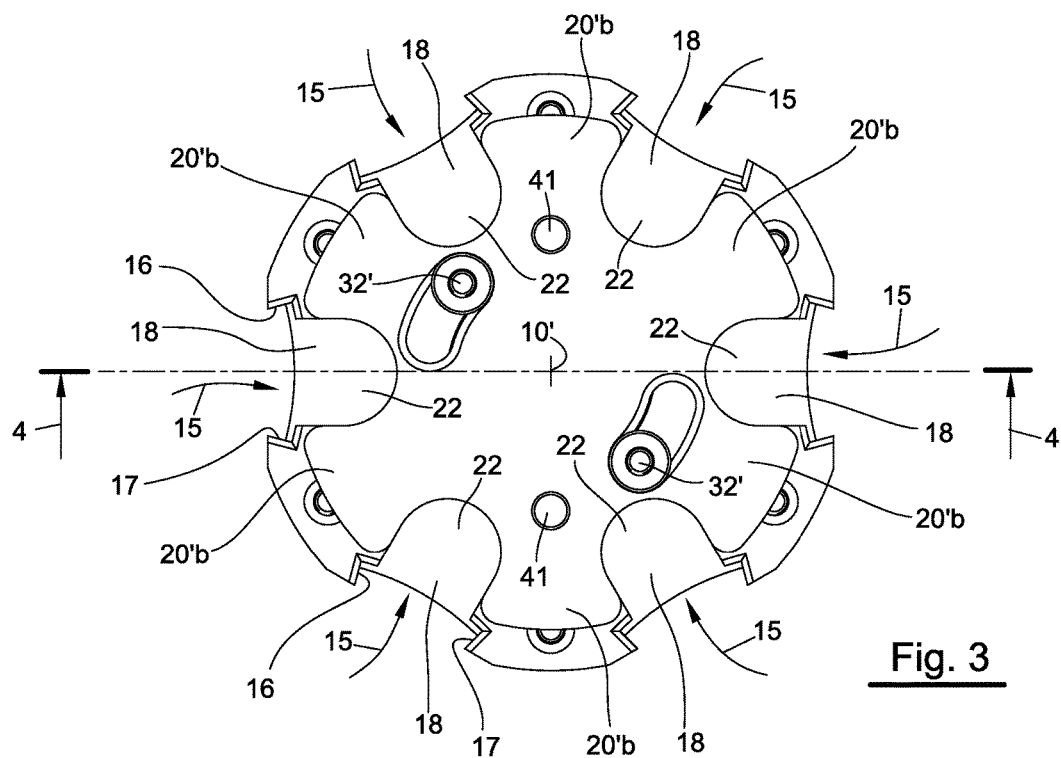
FIG. 3 is a view from direction 3 of FIG. 2.

With particular reference to FIGS. 2 and 3, body part 14 of the pole member holder 10 is provided with seats 15 positioned at equal angular distances around longitudinal axis 10' of body part 14 of pole member holder 10.

In FIGS. 2 and 3, body part 14 has been disassembled from pallet 40 and pole members 11 have been removed from seats 15 for reasons of clarity.

Figure 4:
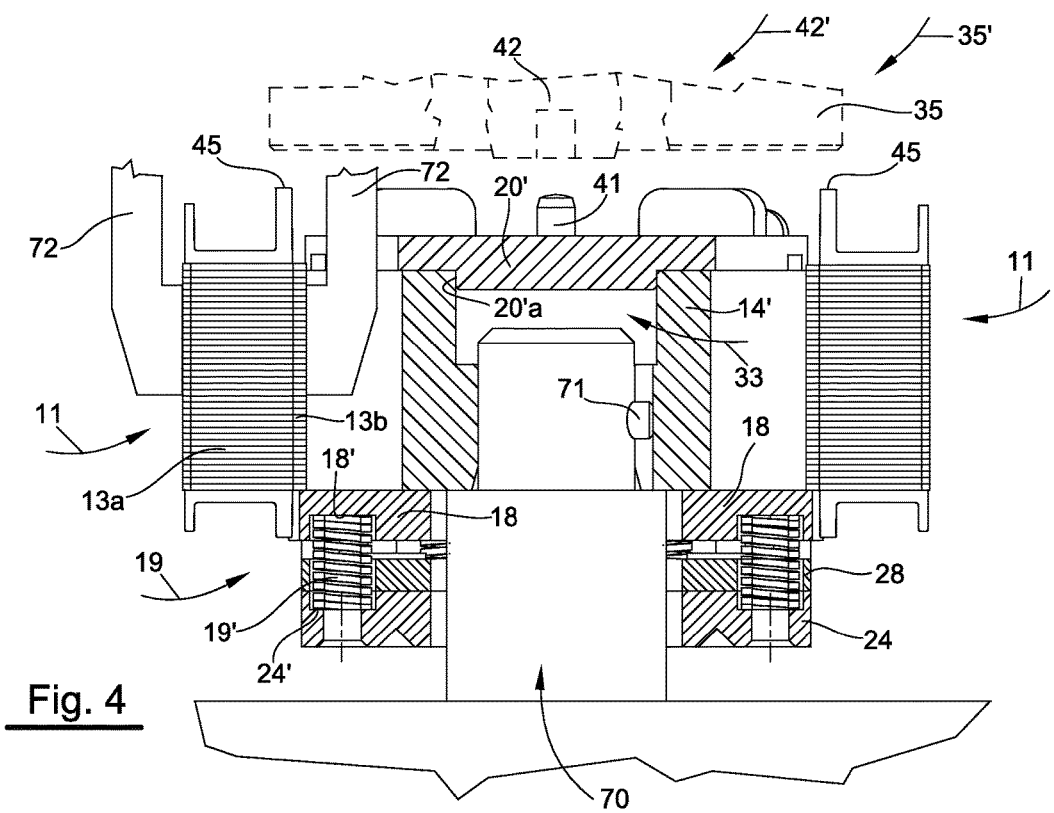
FIG. 4 is a partial section view from directions 4-4 of FIG. 3, illustrating additional parts that have been omitted in FIG. 3.

Pole members 11 can be seated in the seats 15, as shown in FIGS. 1 and 4, by placing a portion of each of the two lateral side 11' of pole members 11 in a respective channel 16 and 17 of a seat 15. Channels 16 and 17 have the form of grooves machined in the seats 15, as shown in FIGS. 2 and 3.

As shown in FIGS. 2, 3, 4 and 6, a base member 18 in the form of a plate is assembled adjacent the base end of each seat 15. In particular, base members 18 are assembled in seats 28' of intermediate member 28, which can be in the form of a plate assembled by means of bolts 65 adjacent to an end of body part 14 (see also FIG. 6).

With reference to FIGS. 2 and 4, a bottom member 24 is assembled adjacent to intermediate member 28. Bottom member 24 has seats 24' for receiving pushing means 19 like springs 19'. More particularly, an end of springs 19' is present in a respective seat 24' of bottom member 24 of each of seats 15. The other ends of springs 19' are received in a respective seat 18' of base member 18. The support assembly formed of base members 18 assembled in their respective seats 28' of intermediate member 28, and of bottom member 24 assembled against intermediate member 28, is bolted to central part 14' of body part 14 by means of bolts 65 (see also FIG. 6). In this support assembly, springs 19' are preloaded in order to force base members 18 in abutment with the end of central part 14' when the pole members are not present in seats 15, or are present but not locked in seats 15, as shown in FIGS. 2 and 4.

Central part 14' is also provided with recess portions 22 that are in communications with seats 15, as shown in FIG. 3.

Body part 14 is assembled and referenced on pallet 40 by inserting shaft device 70 in a hollow centre of central part 14', as shown in FIG. 4. In particular, shaft device 70 comprises teeth 71, which engage a key way of central part 14', as shown in FIG. 4. This engagement assures that central part 14' is in a predetermined angular position on pallet 40.

Locking means 20 in the form of a plate member 20' are assembled on central part 14', as shown in FIGS. 1-4. Plate member 20' is provided with slots 31 for receiving portions of bolts 32. Bolts 32 are screwed into central part 14'. The heads 32' of bolts 32 remain adjacent and at the same level of plate member 20' (see FIGS. 2 and 3). Plate member 20' is centred on axis 10', with shoulder portion 20'a engaged in the hollow portion 33 of central part 14', as shown in FIG. 4.

In this way, plate member 20' can rotate around axis 10' to bring portions 20'b of plate member 20' over seats 15 (see the condition of FIG. 5). In particular, each of the portions 20'b is provided with a border 34, which engages an end 13b' of flange portion 13b of pole member 11, as shown in FIG. 5a.

Plate member 20' can be rotated around axis 10' by the engagement of pins 41 of plate member 20'. Pins 41 are engaged with respective rotating means 42' in the form of bushes 42, as shown with dash line representation in FIG. 4. Once bushes 42 are engaged with pins 41, bushes 42 are rotated around axis 10' to rotate plate member 20' around axis 10' in order to bring portions 20'b of plate member 20' over seats 15.

To position pole members 11 in seats 15, pole members 11 can be held on two opposite sides of body portions 13a of pole members 11 by grippers 72. Then, the lateral sides 11' of pole members 11 can be aligned with channels 16 and and lowered therein, as shown in FIG. 4 (lateral sides 11' are not numbered in FIG. 4, although they are shown and numbered in FIG. 1).

In particular, as shown in FIG. 4, grippers 72 are shown clamping a pole member on two opposite sides of body portions 13a of pole members 11 after having have lowered the sides 11' of the pole member 11 in channels 16 and 17. One of the grippers 72 is received in recess portion 22, as shown in FIG. 4. Similarly a pole member 11 can be removed from a seat 15 by raising grippers 72, once grippers 72 have gripped the pole member 11 like is shown in FIG. 4.

The sides 11' of pole members 11 can be lowered into channels 16 and 17 until an end of flange portion 13b" of pole members 11 abuts against a base member 18, as shown in FIGS. 1 and 4.

Successively (see FIG. 4), means 35', which can have for example the form of a ring 35 (shown with dashed line representation) apply a pushing force which is opposite to the elastic force of pushing means 19, in particular opposite to the elastic force of spring 19. Means 35' can be brought into abutment with structural portions 45 of pole members 11 to push the pole members 11 below a predetermined level with reference to the underside of plate member 20'. In this way an opposite force action is applied, which compresses springs 19'. Once the predetermined level has been reached, plate member 20' can be rotated around axis 10' to have border 34 aligned with ends 13b' of the flange portions 13b of pole members 11, as shown in FIG. 5a.

Successively, the pushing action against portions 45 can be stopped and ring 35 can be removed from the engagement position. This allows springs 19', which are no longer opposed by ring 35, to bias by means of base member 18 the lower end 13b" of flange portion 13b upwards see FIG. 5b. This causes the upper end 13b' of flange portion 13b to engage against border 34 of the underside of plate member 20', as shown in FIGS. 5a and 5b.

As a result, all the pole members 11 of pole member holder 10 will have one of ends like 13b' of the flange portions 13b aligned against a same reference surface, which is the surface of border 34 on the underside of plate member 20', and will be locked in seats 15. The end 13b' of the flange portions which is aligned with the reference surface of border 34 can correspond to the top of a pile of laminations 80 that form the magnetic flux structure of the pole members 11. The single laminations can have thickness variations within certain tolerances. This can result in a situation where the various pole member have different heights of the pile of laminations, however the pole members 11 will be aligned with one of their ends 13b' at a common reference surface of plate member 20', which is the surface of border 34.

FIG. 5 shows body part 14 positioned in a winder for winding conductor W in order to form turns C on body portion 13a of pole members 11. In the case of FIG. 5, the conductor dispenser member 50' is in the form of a flyer 50 which rotates around axis 50" to form the turns C. As an alternative to using a flyer, the conductor dispenser member 50' can be a needle which moves with translation and rotation motions around pole members 11. In addition the needle can have stratification motion to dispose the turns radially, i.e. towards axis 10' of holder.

In FIG. 2, body part 14 has been removed from the shaft device 70 present on pallet 40, (see FIG. 4) by means of the grippers not shown, which can grip portions 14c of central part 14'. In particular, the grippers clamp on the external portions of central part 14' to grasp and transfer body part 14 to a winder with the pole members 11 locked and referenced in seats 15, as shown in FIG. 5.

Body part 14 is held in the winder by means of shaft device 60. Shaft device 60 comprises pressing means 61, for example in the form of pressing teeth 61', which protrude from shaft 62 to press on shoulder 63 of central part 14', as shown in FIG. 5. This results in a clamping action of bottom member 24 on cone members 64 of shaft device 60, to assure that body part 14 remains stable during the application of the winding tensions. Tooth 65 engages the key way of central part 14', as shown in FIG. 5 to assure that body part 14 is in a predetermined angular position on shaft device 60, and therefore that body part 14 can be angularly indexed with respect to a flyer, or needle present in the winder.

In the case of FIGS. 1 and 3, body part 14 is arranged to be dis-assembled from pallet 40 for transfer to a winder. An alternative solution can be that holder 10 is permanently assembled on the pallet. In this case, pallet 40 together with holder 10 are transferred to the winder where pallet 40 becomes positioned to position the pole members 11 for winding.

Another alternative solution can provide that shaft device 70 is assembled on a continuous conveyor like a chain or belt conveyor, therefore body part 14 can be dis-assembled from the conveyor for transfer to the winder.

Figure 7:
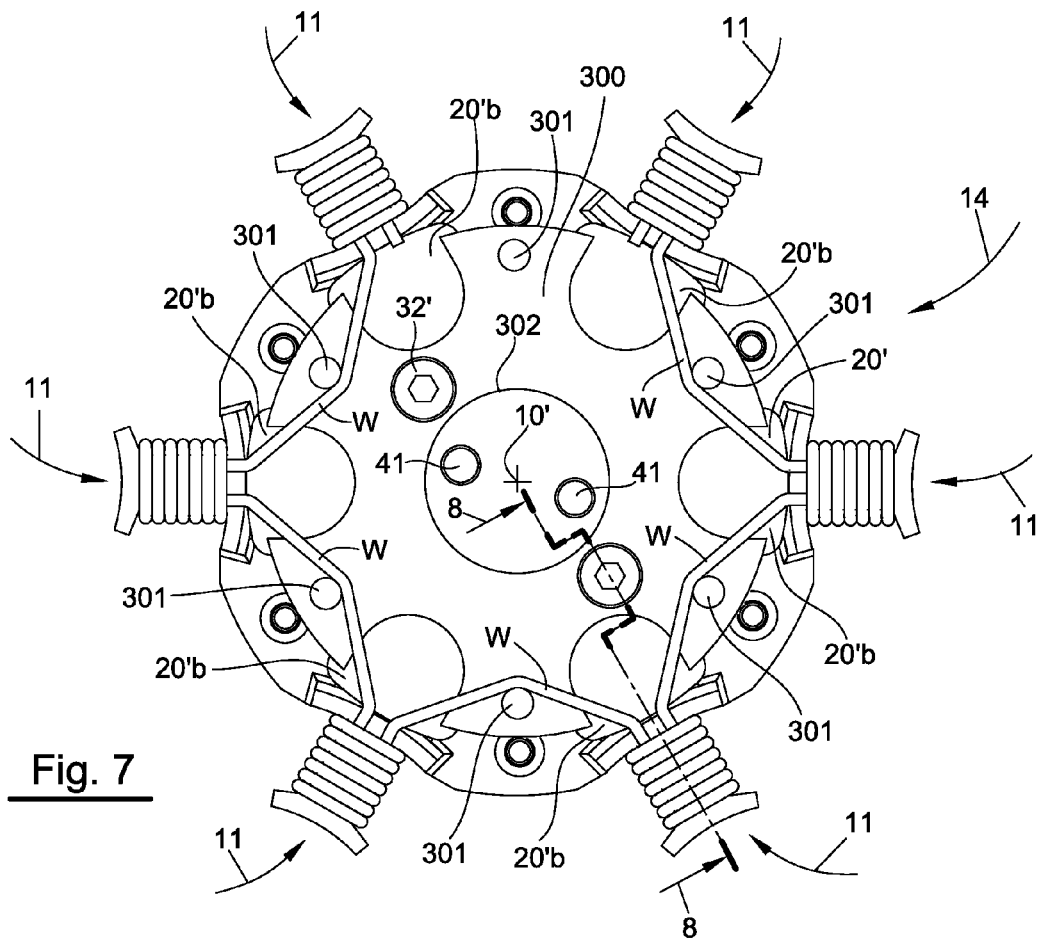
FIG. 7 is a view similar to the view of FIG. 3, however certain parts have been added to the embodiment of FIG. 7 with respect to the embodiment of FIG. 3.

FIG. 7 shows an embodiment where support 300 for the conductor is stationary with respect to body part 14 adjacent to plate member 20'.

Support 300 for the conductor W is stationary with respect to body part 14, while plate member 20' is free to rotate around axis 10' when pins 41 are caused to rotate plate member 20' around axis 10'. This rotation is accomplished to bring portions 20'b of plate member 20' above seats 15, as described above, to reference and lock the pole members 11. Support 300 for the conductor is provided with an aperture 302 for allowing access of bushes like 42 of FIG. 4 to pins 41 for rotating plate member 20' around axis 10'. Support 300 for the conductor is provided with guides 301 of the conductor around which conductor W can be made to pass for maintaining conductor W anchored and tensioned.

As shown in FIG. 7, conductor W connects the coils of the various pole members 11. Conductor W is made to pass around guides of conductor 301 using automatic manipulators of the conductor, not shown the figure, during assembly of pole members 11 in seats 15.

In the opposite situation of disassembly of pole members 11 from pole holder 10, grippers can remove the pole members from the seats 15, as described above, and the manipulators of the conductor can remove conductor W from the winding conditions around guides 301 of the conductor.

Figure 8:
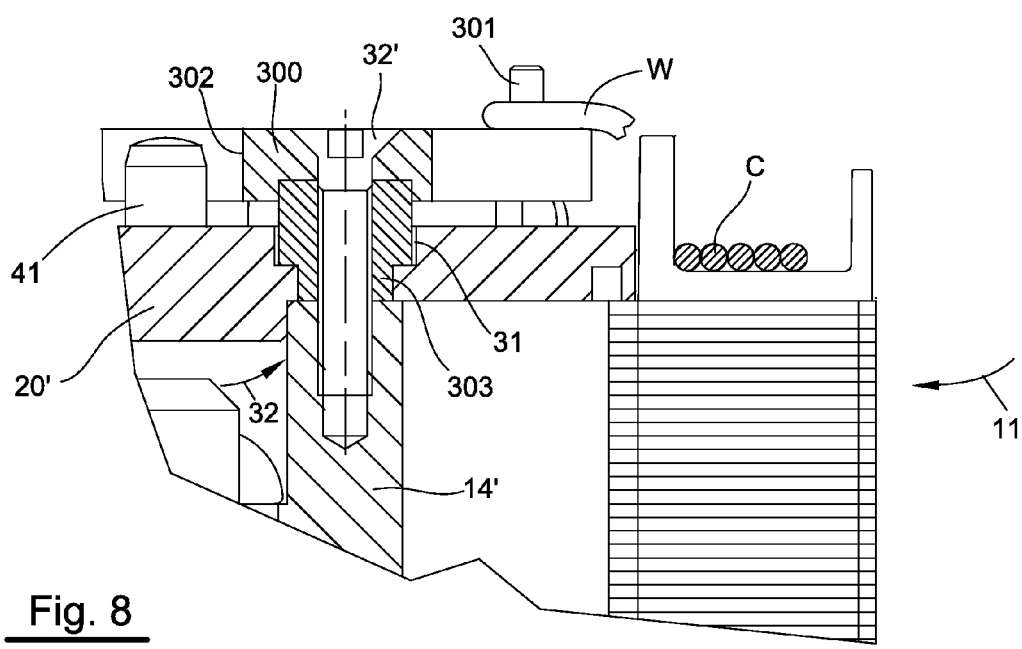
FIG. 8 is a partial section view as seen from directions 8-8 of FIG. 7.

FIG. 8 shows assembly configuration of support of the conductor 300 with the central part 14'. A bush 303 is interposed between support of the conductor 300 and plate member 20'. Bolt 32 connects the support of the conductor 300 and bush 303 to the central part 14'. The slots 31 of the plate member 20' allow the plate member 20' to rotate around axis 10' when pins 41 rotate around axis 10' caused by the rotation of bushes like 42.

The foregoing description of an embodiment of the method and of the apparatus according to the invention will so fully reveal the invention according to the conceptual point of view so that other, by applying current knowledge, will be able to modify and/or adapt in various applications this specific embodiment without further research and without parting from the invention, and, accordingly, it is meant that such adaptations and modifications will have to be considered as equivalent to the exemplified specific embodiment. The means and the materials to realise the different functions described herein could have a different nature without, for this reason, departing from the field of the invention. It is to be understood that the phraseology or terminology that is employed herein is for the purpose of description and not of limitation.

The invention claimed is:

1. A pole member holder for holding a plurality of pole members, wherein a first pole member of the plurality of pole members comprises at least a flange portion joined to a main portion for receiving turns of a plurality of coils during winding, the pole member holder comprising:

a main body with a plurality of seats, wherein each seat of the plurality of seats receives the flange portion of a respective pole member;

a plurality of base members assembled on the main body, each base member of the plurality of base members being assembled adjacent to a first end of a respective pole member of the plurality of pole members for engaging the first end of the respective pole member;

a pusher associated with each seat of the plurality of seats for pushing the plurality of base members to push the plurality of pole members; and a lock associated with each seat of the plurality of seats for engaging and referencing a second end of each pole member of the plurality of pole members.

2. The pole member holder of claim 1 wherein the lock is assembled to rotate on the main body to lock the plurality of pole members.

3. The pole member holder of claim 1 wherein the lock is provided with a common reference surface for referencing the second end of each pole member of the plurality of pole members.

4. The pole member holder of claim 3 wherein a base member of the plurality of base members pushes a lower end of the flange portion upwards and the reference surface engages an upper end of the flange portion.

5. The pole member holder of claim 1 wherein a seat of the plurality of seats is in communication with a recess portion of the main body.

6. The pole holder of claim 1 further comprising a conductor support provided with a plurality of conductor guides where a conductor of the plurality of coils is anchored and tensioned.

7. The pole member holder of claim 1 wherein a support assembly is assembled on the main body, the support assembly comprising a bottom member for supporting the pusher and an intermediate member for seating the plurality of base members.

8. The pole member holder of claim 1 wherein the main body is provided with a hollow portion for receiving a shaft device to position the pole member holder on a transport device.

9. The pole member holder of claim 8 wherein a presser is applied in said hollow portion to hold the pole member holder in a winder.

10. An apparatus for winding turns of coils on a plurality of pole members, wherein each pole member of the plurality of pole members comprises at least a flange portion joined to a main portion for receiving turns of a plurality of coils during winding, the apparatus comprising:

a conductor dispenser member for dispensing a conductor to form turns of the plurality of coils by accomplishing motion with respect to the pole member being wound; and a pole member holder, wherein the pole member holder is provided with:

a main body with a plurality of seats for receiving the flange portions of each pole member of the plurality of pole members;

a plurality of base members of the plurality of seats for engaging a first end of each pole member of the plurality of pole members;

a pusher associated with each seat of the plurality of seats for pushing the plurality of base members with a pushing force to push the plurality of pole members; and a lock associated with each seat of the plurality of seats for engaging and referencing a second end of each pole member of the plurality of pole members with respect to the conductor dispenser member.

11. The apparatus of claim 10 further comprising a shaft device for being inserted in a hollow of the pole member holder to position the pole member holder with respect to the conductor dispenser member.

12. The apparatus of claim 11 further comprising a second shaft device for being inserted in the hollow of the pole member holder to position the pole member holder with respect to a transport device.

13. The apparatus of claim 10 wherein the lock is assembled to rotate on the main body to lock the pole members.

14. The apparatus of claim 10 wherein the lock is provided with a common reference surface for referencing the second end of each pole member of the plurality of pole members.

15. The apparatus of claim 14 wherein each base member of the plurality of base members pushes a lower end of the flange portion of each pole member of the plurality of pole members upwards and the reference surface engages an upper end of the flange portion of each pole member of the plurality of pole members.

16. The apparatus of claim 10 further comprising a rotator for rotating the lock and an opposing member for applying an opposite force to the pushing force to position the plurality of pole members for referencing.

17. The apparatus of claim 10 further comprising a conductor support provided with a plurality of conductor guides where the conductor of the plurality of coils is anchored and tensioned.

18. A method for winding turns of coils on a plurality of pole members, wherein each pole member of the plurality of pole members comprises at least a flange portion joined to a main portion for receiving turns of the coils during winding, the method comprising:
 accomplishing motion of a conductor dispenser member for dispensing a conductor to form turns of the coils with respect to each pole member of the plurality of pole members being wound;
 providing a pole member holder, wherein the pole member holder comprises a main body with a plurality of seats and with a plurality of base members;
 receiving the flange portions of each pole member of the plurality of pole members in a respective seat of the plurality of seats;
 engaging a first end of each pole member of the plurality of pole members with the plurality of base members assembled on the main body;
 pushing the plurality of base members with a pushing force to push the plurality of pole members; and
 engaging and referencing a second end of each pole member of the plurality of pole members with respect to the conductor dispenser member.

19. The method of claim 18 wherein referencing of the second ends of each pole member of the plurality of pole members occurs with a common reference surface.

20. The method of claim 19 wherein a base member of the plurality of base members pushes a lower end of the flange portion of a respective pole member of the plurality of pole members upwards and the reference surface engages an upper end of the flange portion of the respective pole member of the plurality of pole members.

21. The method of claim 18 further comprising applying an opposite force to the pushing force to position the plurality of pole members for referencing.

22. The method of claim 18 further comprising providing a conductor support with conductor guides, and anchoring the conductor of the plurality of coils around the conductor guides.

* * * * *